United States Patent
Kanno et al.

(10) Patent No.: US 7,900,477 B2
(45) Date of Patent: Mar. 8, 2011

(54) METHOD OF POSITIONING A GLASS PLATE USING PIVOTING ROLLERS

(75) Inventors: Ryo Kanno, Kanagawa (JP); Toshimitsu Sato, Aichi (JP); Takashi Hirotsu, Tokyo (JP); Tomohiro Suwa, Kanagawa (JP); Isao Saito, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 739 days.

(21) Appl. No.: 11/925,345

(22) Filed: Oct. 26, 2007

(65) Prior Publication Data

US 2008/0060386 A1  Mar. 13, 2008

Related U.S. Application Data

(62) Division of application No. 10/600,658, filed on Jun. 23, 2003, now Pat. No. 7,712,334.

(30) Foreign Application Priority Data

Jun. 24, 2002  (JP) ................. 2002-182650

(51) Int. Cl.
*C03B 23/02*  (2006.01)
*C03B 35/16*  (2006.01)

(52) U.S. Cl. ........... 65/29.11; 65/29.18; 65/106; 65/107; 65/289; 65/323

(58) Field of Classification Search ............. 65/29.11, 65/29.18, 106, 107, 289, 323
See application file for complete search history.

(56) References Cited

U.S. PATENT DOCUMENTS

| | | | |
|---|---|---|---|
| 1,546,520 A | 7/1925 | Tytus | |
| 2,181,088 A | 11/1939 | Horton et al. | |
| 2,859,857 A | 11/1958 | Cady | |
| 3,580,379 A | 5/1971 | Shuster et al. | |
| 3,964,588 A | 6/1976 | Kornylak | |
| 4,770,120 A | 9/1988 | Komatsu et al. | |
| 4,838,920 A * | 6/1989 | Blasquez-Gonzales et al. ................... | 65/104 |
| 4,865,671 A * | 9/1989 | Bishop et al. ................ | 156/104 |
| 4,976,766 A | 12/1990 | Kuster et al. | |
| 4,979,974 A | 12/1990 | Mathivat et al. | |
| 4,985,059 A | 1/1991 | Letemps et al. | |
| 5,226,942 A | 7/1993 | Letemps et al. | |
| 5,286,271 A * | 2/1994 | Rueter et al. ................... | 65/106 |
| 5,411,128 A | 5/1995 | Vild et al. | |
| 5,669,953 A | 9/1997 | Schnabel, Jr. et al. | |
| 6,397,634 B1 | 6/2002 | Takeda et al. | |

FOREIGN PATENT DOCUMENTS

| | | |
|---|---|---|
| EP | 0 477 913 | 4/1992 |
| EP | 0 667 491 | 10/1995 |
| JP | 6-247728 | 9/1994 |

* cited by examiner

*Primary Examiner* — John Hoffmann
(74) *Attorney, Agent, or Firm* — Oblon, Spivak, McClelland, Maier & Neustadt, L.L.P.

(57) ABSTRACT

There are the steps of conveying a glass plate by a roller conveyor including a plurality of rollers; and moving a roller in contact with the glass plate in conveyance to position the glass plate so as to conform a posture of the glass plate to a reference posture.

6 Claims, 14 Drawing Sheets

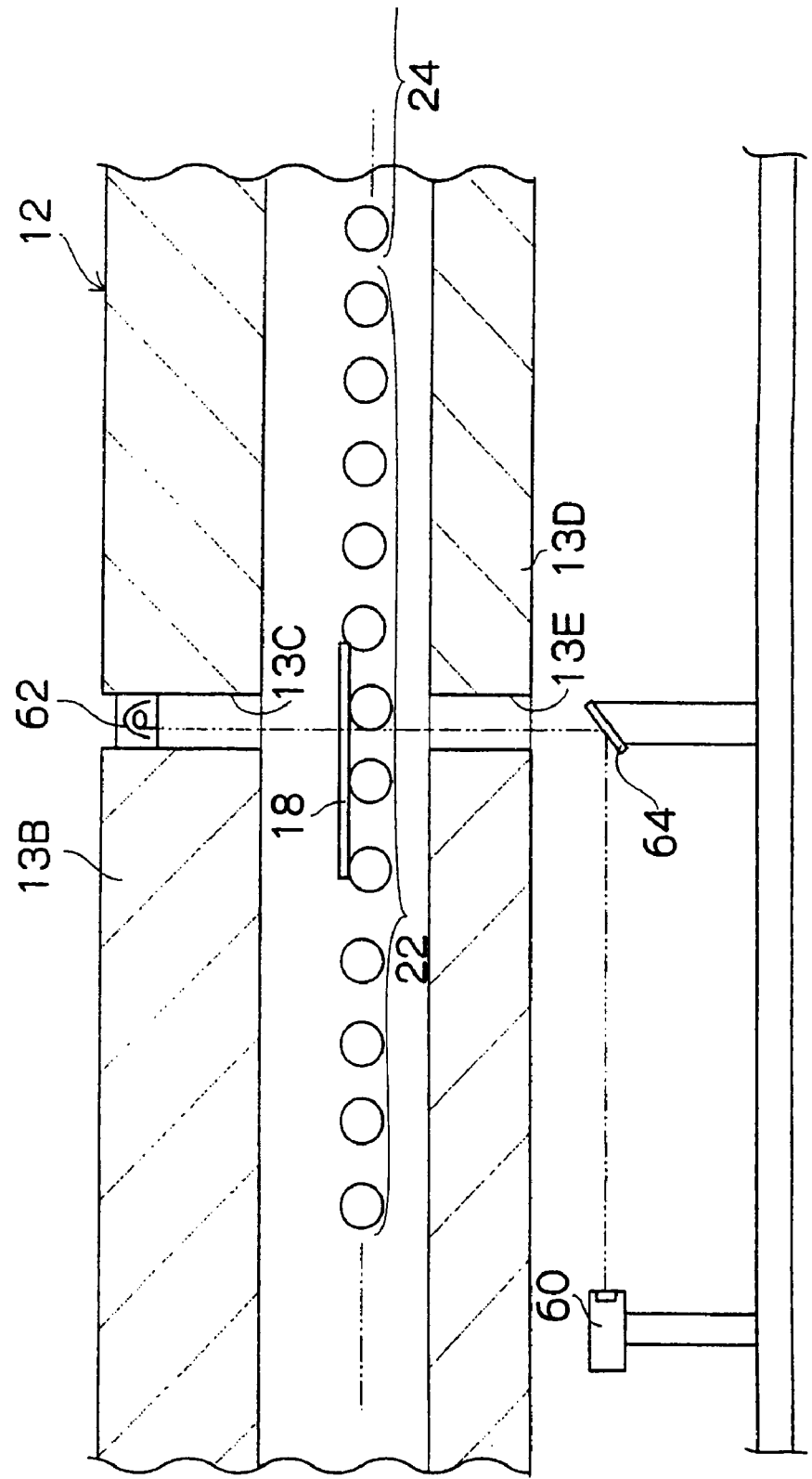

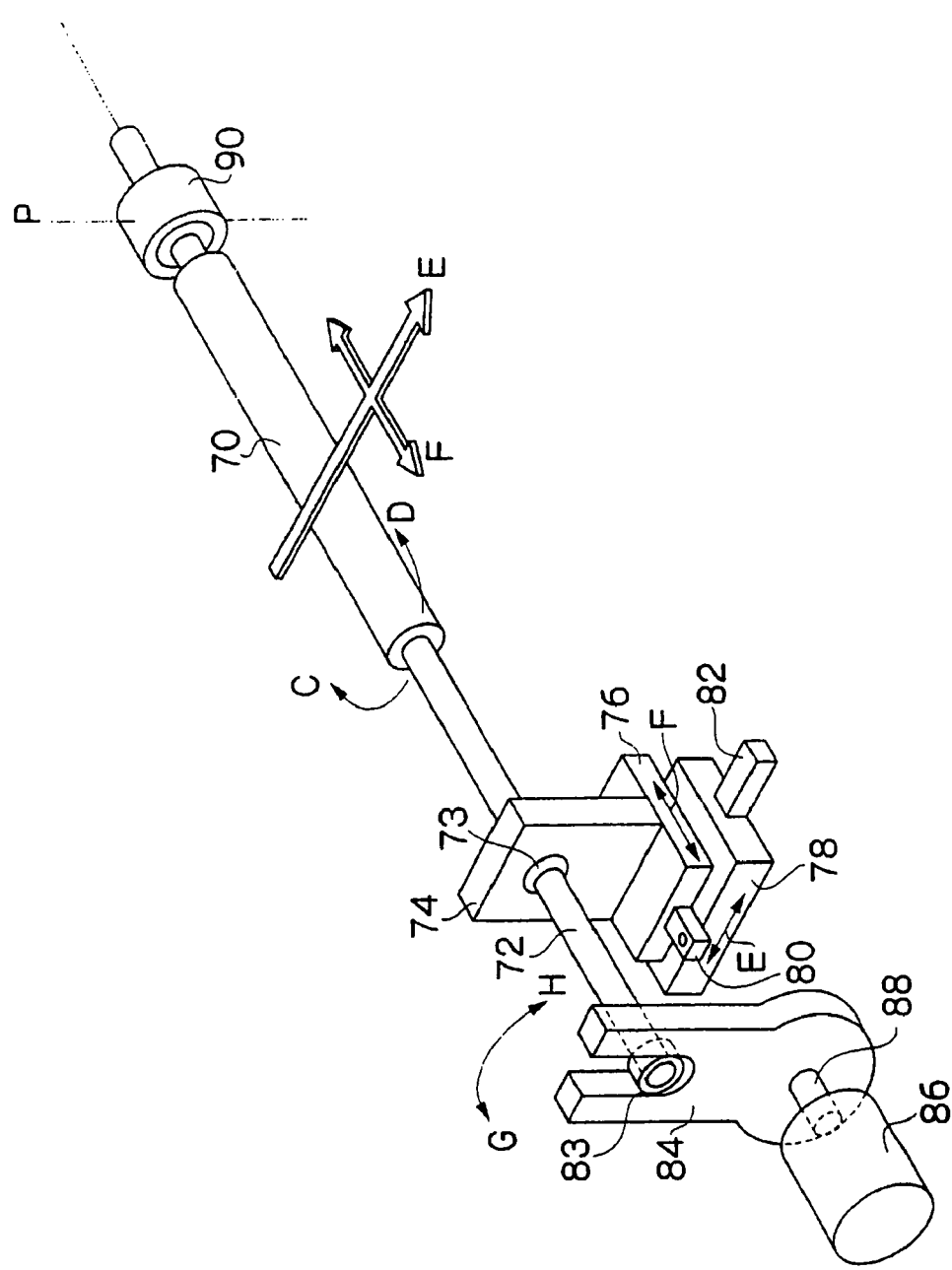

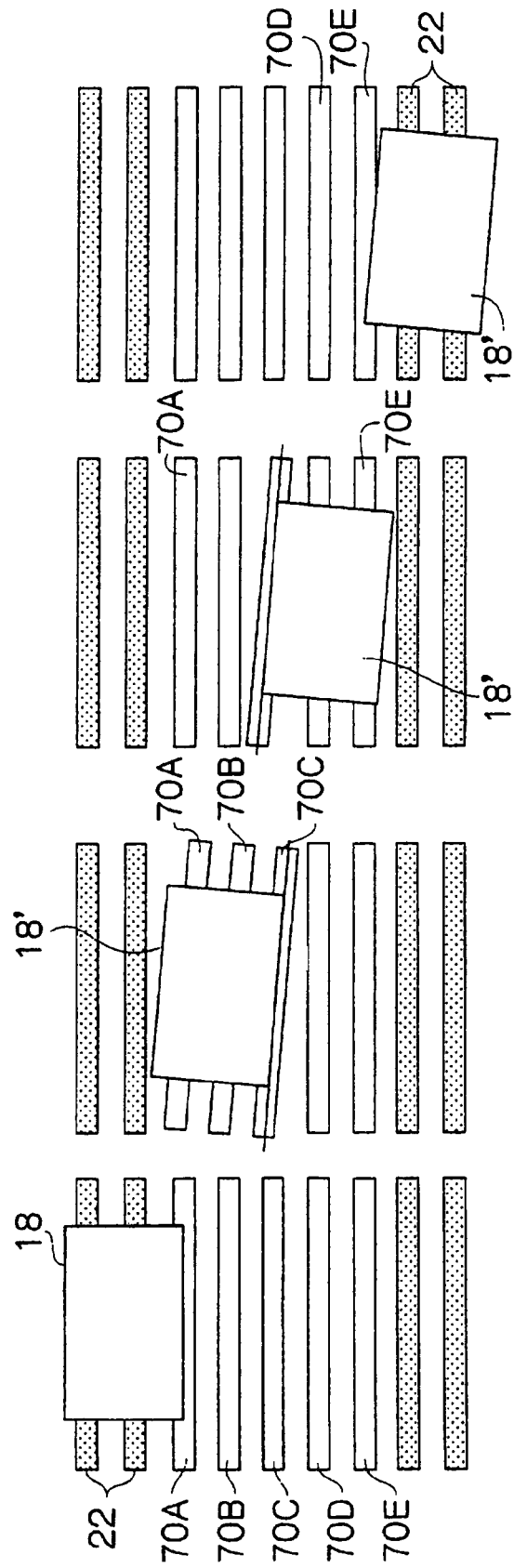

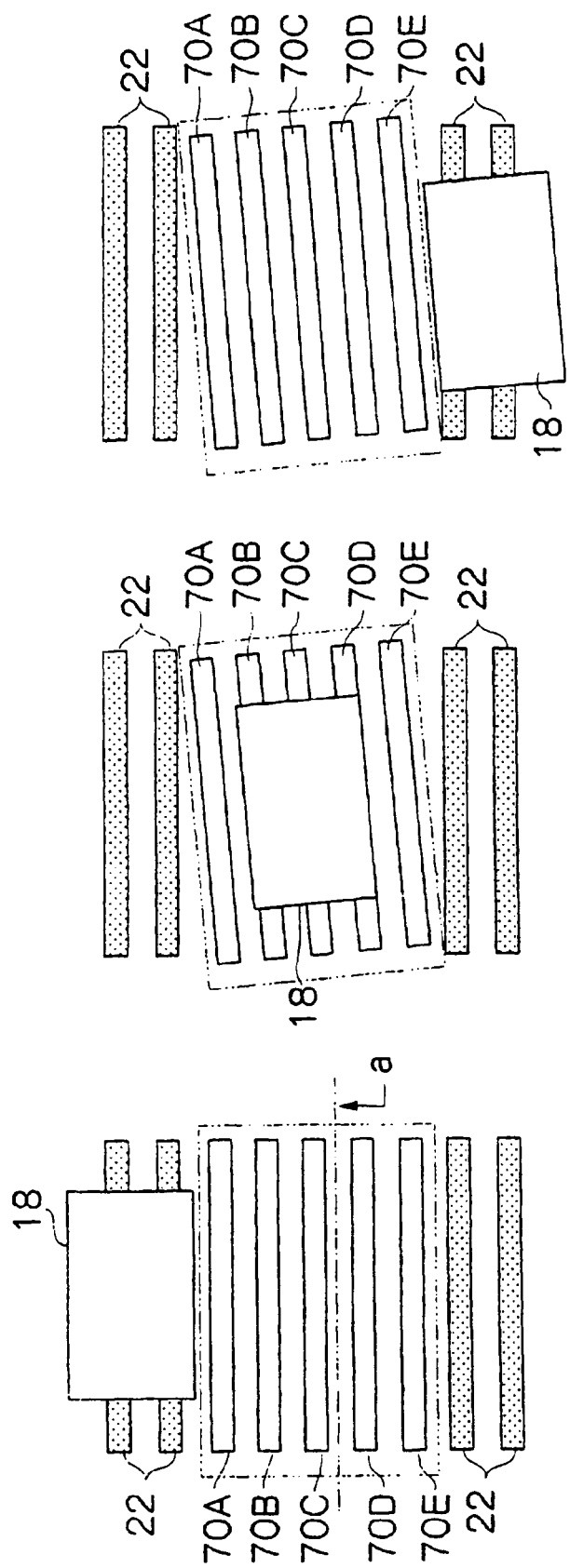

CONVEYING DIRECTION

METHOD OF POSITIONING A GLASS PLATE USING PIVOTING ROLLERS

CROSS-REFERENCE TO RELATED APPLICATIONS

The present application is a division of application Ser. No. 10/600,658, filed on Jun. 23, 2003, which claims priority to Japanese Application No. JP 2002-182650, filed on Jun. 24, 2002, the entire contents of each of which is incorporated herein by reference.

BACKGROUND OF THE INVENTION

1. Field of the Invention

The present invention relates to a method and a system for positioning a glass plate, and a method and a system for bending a glass plate.

2. Description of the Related Art

Explanation will be made about a conventional production procedure for a curved glass plate, which is used as automobile windows. First, a flat glass plate, which has been cut in a certain shape, is conveyed through a heating furnace by a roller conveyor to be heated to a glass bending temperature (600 to 700° C.) by a heater in the heating furnace. Next, the heated glass plate is conveyed onto a bending stage to be pressed, be bent by its own weight or be subjected to another bending treatment so as to have a desired curvature there. After that, the bent plate glass is conveyed onto an air cooling/tempering stage, and cooling air is blown against both surfaces of the bent plate glass from upper and lower blowing heads provided in the air cooling/tempering stage to cool and temper the plate glass, producing a tempered glass plate having a desired curved shape.

The glass plate, which has been conveyed to an outlet of the heating furnace, is positioned so as to have its posture conformed to a reference posture by a positioner and then is conveyed onto the bending stage to be bent (see U.S. Pat. No. 5,669,953). The positioner comprises a plurality of arms for contact with a front edge and lateral edges of a glass plate, and a dive unit for moving these arms to position the glass plate so as to take the reference posture. The length and the shape of the arms need to correspond to the size and the shape of the glass plate. Whenever the model type of a glass plate (the model type of a product) to be produced changes (hereinbelow, referred to as the job change), it is inevitably necessary to use a positioner suited to the changed model type.

The applicants have proposed a glass plate bending system using a roller conveyor, which is novel and innovative (see U.S. Pat. No. 6,397,634). This system includes a roller conveyor comprising a plurality rollers provided so as to be independently and vertically movable. The system lowers rollers lying just under a glass plate in synchronization with conveyance of the glass plate to form the glass plate in a desired curved shape upon completion of conveyance. This bending system needs no exchange of parts irrespectively of the model type of a glass plate to be bent. This bending system can substantially eliminate the job change on the bending stage since the system can bend a glass plate so as to have a desired curvature only by controlling the vertical moving amount of the bending roller, the conveyance speed of the glass plate or the like.

The conventional positioner has caused several problems since, in order to bend a glass plate with good precision, the glass plate needs to be accurately positioned so as to take the reference posture before being conveyed onto the bending stage. Specifically, it has been necessary to use a positioner suited to the model type of a glass plate to be bent as stated earlier. In order to position a glass plate, the arms of the positioner needs to come into contact with the glass plate, which has been heated to the glass bending temperature and been softened. As a result, there have been caused problems that the glass plate is deformed by the impact caused by the contact with the arms, and that the glass plate is abraded by slippage on a roller. Additionally, there has been caused a problem that there is a limitation to the improvement in productivity since it is necessary to stop the glass plate in the middle of conveyance before positioning the glass plate.

SUMMARY OF THE INVENTION

The present invention is proposed in consideration of the circumstances stated earlier. It is an object of the present invention to provide a method and a system for positioning a glass plate, which are capable of making the generation of deformation or damage in a glass plate more difficult in comparison with the conventional method and system, and a method and a system for bending a glass plate, which are capable of improving productivity in comparison with the conventional method and system.

The present invention provides a method for positioning a glass plate, comprising conveying a glass plate by a roller conveyor including a plurality of rollers; and moving a roller in contact with the glass plate in conveyance to position the glass plate so as to conform a posture of the glass plate to a reference posture.

In a mode of the present invention, it is preferable that the conforming of the posture of the glass plate to the reference posture is performed by moving the roller in contact with the glass plate in a longitudinal direction thereof.

In another mode of the present invention, it is preferable that the conforming of the posture of the glass plate to the reference posture is performed by displacing a roller in contact with the glass plate obliquely with respect to a longitudinal direction thereof.

In another mode of the present invention, it is preferable that the method further comprises using an imaging means to capture an image of the glass plate conveyed by the roller conveyor; recognizing the posture of the glass plate based on the captured image of the glass plate; comparing the recognized posture with the reference posture previously stored to find a deviation amount of the posture of the glass plate with respect to the reference posture; and finding an axial displacement amount to be applied to the roller in contact with the glass plate based on the found deviation amount and moving the roller in contact with the glass plate in accordance with the found axial displacement amount.

In another mode of the present invention, it is preferable that the method further comprises independently moving plural rollers lying under the glass plate one after another in conjunction of the conveyance of the glass plate.

In another mode of the present invention, it is preferable that the method further comprises simultaneously moving plural rollers supporting the glass plate.

The present invention also provides a system for positioning a glass plate, comprising a roller conveyor, which includes a plurality of rollers conveying a glass plate; and means for moving a roller in contact with the glass plate in conveyance to position the glass plate so as to conform a posture of the glass plate to a reference posture.

In a mode of the present invention, it is preferable that the system further comprises an imaging means for capturing an image of the glass plate conveyed by the roller conveyor; a posture recognizing means for recognizing the posture of the glass plate based on the captured image of the conveyed glass plate; a deviation amount finding means for comparing the recognized posture with the reference posture previously stored to find a deviation amount of the posture of the conveyed glass plate with respect to the reference posture; and a displacement amount finding means for finding an axial displacement amount to be applied to the roller in contact with the glass plate based on the found deviation amount; and a roller displacing means for moving the roller in contact with the glass plate in accordance with the found axial displacement amount.

In another mode of the present invention, it is preferable that at least one roller forming the roller conveyor is provided so as to be movable in a direction perpendicular to a conveying direction of the glass plate.

In another mode of the present invention, it is preferable that at least one roller forming the roller conveyor is provided so as to be swingable on a conveying surface for the glass plate.

The present invention also provides a method for bending a glass plate, comprising using any one of the methods stated above to position the glass plate so as to conform a posture of the glass plate to a reference posture, the glass plate having been heated to a glass bending temperature; and bending the positioned glass plate in a desired curved shape.

In a mode of the present invention, it is preferable that the bending of the positioned glass plate is performed by making use of vertical movement of rollers.

The present invention also provides a system for bending a glass plate, comprising any one of the systems stated above; and means for bending the positioned glass plate in a desired curved shape.

In a mode of the present invention, it is preferable that the means for bending the positioned glass plate in a desired curved shape comprises a roller conveyor including a plurality of rollers, which are independently and vertically movable.

BRIEF DESCRIPTION OF THE DRAWINGS

FIG. 5 is a schematic view explaining how to detect the position of a glass plate on rollers;

FIG. 8 is a perspective view showing the structure of a positioning roller according to another typical example;

FIGS. 10A to 10D are schematic views showing how a glass plate is sequentially positioned;

FIGS. 12A to 12C are schematic views showing how a glass plate is sequentially positioned;

DETAILED DESCRIPTION OF THE PREFERRED EMBODIMENTS

Now, preferred embodiments of the method and the system for positioning a glass plate, and the method and the system for bending a glass plate according to the present invention will be described in detail, referring to the accompanying drawings.

Figure 1:
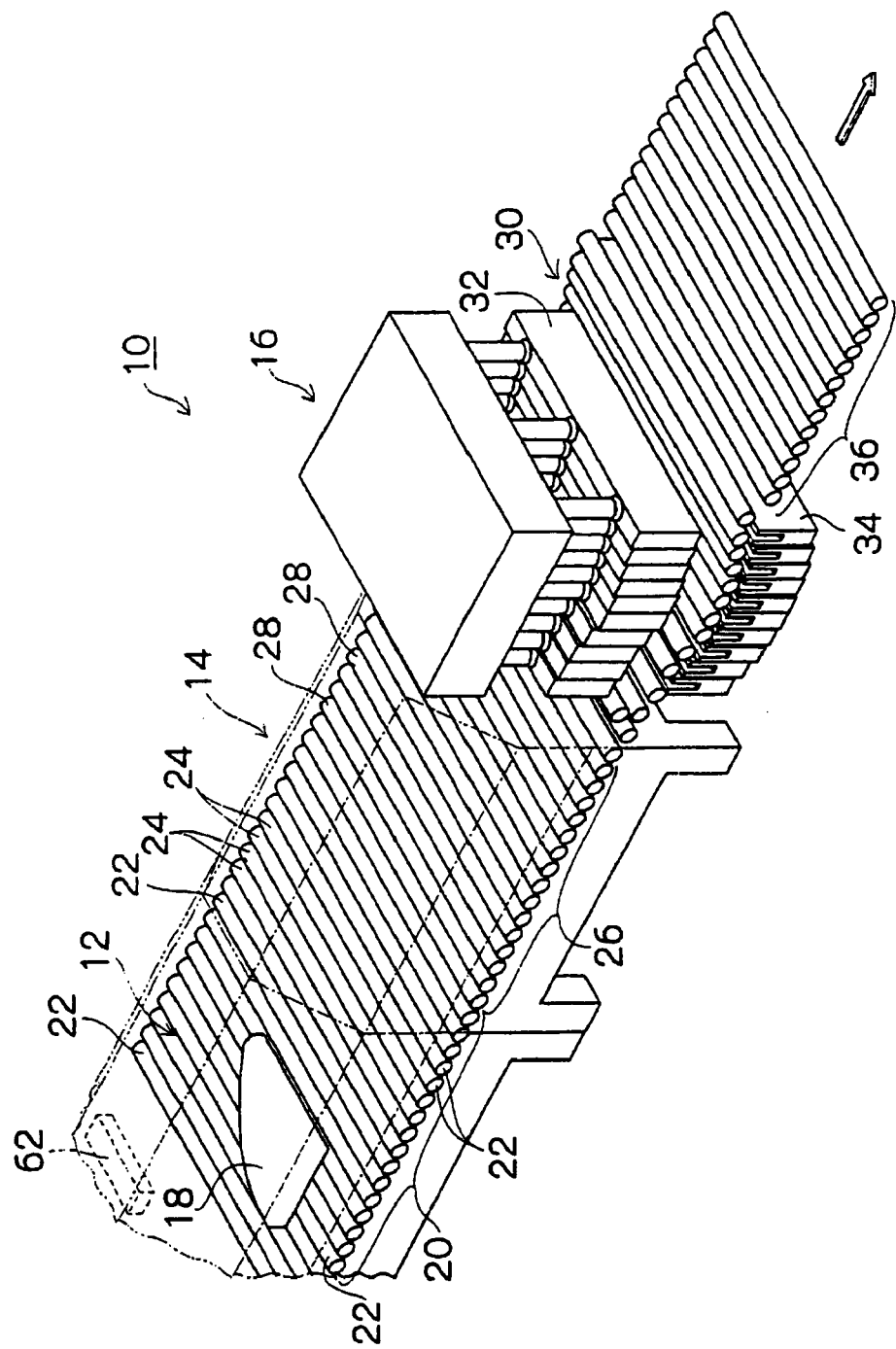
FIG. 1 is a perspective view showing the entire system for bending a glass plate according to an embodiment of the present invention.

A system for bending a glass plate 10 shown in FIG. 1 mainly includes a heating furnace 12, a bending stage 14 and an air cooling/tempering device 16. The heating furnace 12 is a tunnel-shaped furnace made of refractory bricks or the like, which includes a roller conveyor 20 for conveying a glass plate 18, a light source 62 for lighting up the glass plate 18 at the time of positioning the glass plate, an electric heater (not shown) for heating a glass plate or another heater. The roller conveyor 20 includes a plurality of rollers 22, which extend to a bending roller conveyor 26 on the bending stage 14.

The bending roller conveyor 26 includes a plurality of bending rollers 28, which are independently and vertically movable. The bending roller conveyor is similar to the roller conveyor disclosed in U.S. Pat. No. 6,397,634. The air cooling/tempering device 16 includes an upper blowing head 32 provided vertically above a roller conveyor 30 and a lower blowing head 34 provided vertically under the roller conveyor 30. The air cooling/tempering device is one that blows out air to cool the glass plate 18 conveyed by the roller conveyor 30 after bending the glass plate. Downstream of the roller conveyor 30, there is provided a roller conveyor 36, which conveys the tempered glass plate 18 to an inspection device in a subsequent process.

Now, explanation will be made about a bending process for bending the glass plate 18 by the bending system 10. The glass plate, which is flat before being bent, is put on the roller conveyor 20 at an inlet (not shown) of the heating furnace 12 and is conveyed from upstream to downstream in the heating furnace 12 by rotational movement of the plural rollers 22. While the glass plate 18 is being conveyed through the heating furnace, the glass plate is heated and softened by the electric heater or a gas burner (not shown), which is provided in the heating furnace 12. Next, the glass plate, which has been heated to the glass bending temperature, is positioned so as to take a reference posture by five positioning rollers 24A, 24B, 24C, 24D and 24E (see FIG. 2), which are provided at a downstream portion of the roller conveyor 20. Then, the glass plate is transferred onto the bending roller conveyor 26, which is provided on the bending stage 14.

Although explanation will be made about a case wherein five positioning rollers are used, the present invention is not limited to such a case. The positioning operation according to the present invention may be performed by using at least one positioning roller.

Next, the glass plate 18, which has been conveyed on the bending stage 14, is bent so as to have a certain curvature by vertical movement of the plural bending rollers 28 while being conveyed by the bending roller conveyor 26. Specifically, as shown in FIG. 13(B), the rollers 28D, 28E and 28F, which are supporting the glass plate 18, are lowered in comparison with the rollers 28C and 28G to bend the glass plate 18 by its own weight. As the glass plate 18 is conveyed downstream, the degree of lowering of rollers lying just under the glass plate 18 becomes gradually greater (see FIGS. 13(B)

to 13(E)). Thus, the glass plate 18 is bent into a desired curved shape when the glass plate has arrived at an outlet of the bending stage 14.

The glass plate 18 thus bent is carried out from the outlet of the bending stage 14 and is transferred onto the roller conveyor 30 to be cooled and tempered by air blown off by the air cooling/tempering device 16. After that, the glass plate is carried out from an outlet of the air cooling/tempering device 16 and is transferred onto the roller conveyor 36 to be conveyed toward the inspection device in the subsequent process. This is the explanation of the bending process for bending the glass plate 18 by the bending system 10.

Now, the glass plate positioning system according to this embodiment will be described in detail. The positioning system mainly includes the five positioning rollers 24A to 24E shown FIG. 2, electric motors for driving these rollers (causing these rollers to perform a rotational movement and a positioning operation), and a controller for controlling the electric motors and the like. The controller 66 controls axial movements (displacements) of these rollers and the rotational speeds of these rollers to conform the posture of the glass plate 18 to the reference posture.

Figure 2:
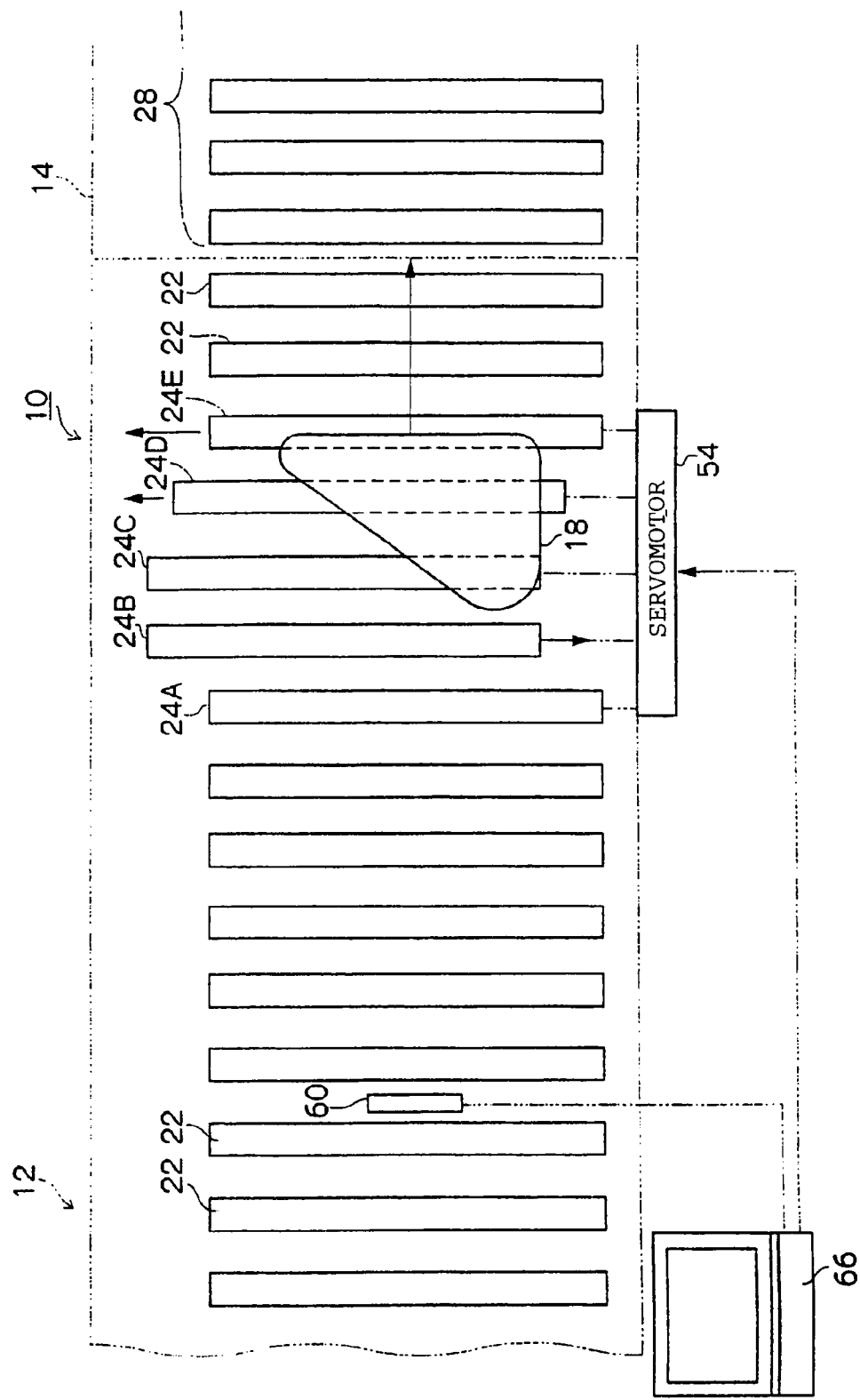
FIG. 2 is a schematic plan view showing the roller conveyor shown in FIG. 1.
Figure 3:
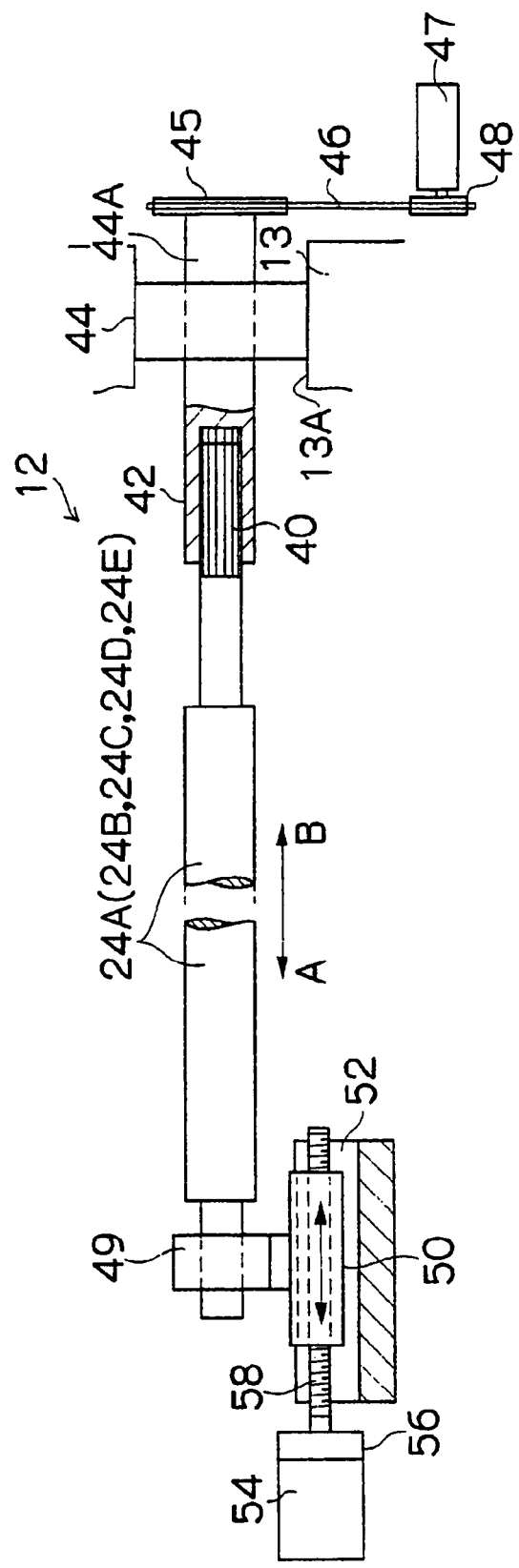
FIG. 3 is a front view showing the structure of a positioning roller with some parts shown in section.

The positioning rollers 24A to 24E are provided so as to extend perpendicular to the conveying direction of the glass plate 18 as shown in FIG. 2. Each of the positioning rollers 24A to 24E has a right end formed with a male splined shaft 40 as shown in FIG. 3. The splined shaft 40 is engaged with a female splined shaft 42, which is formed in a cylindrical shape. By this arrangement, each of the positioning rollers 24A to 24E is coupled with the female splined shaft 42 so as to be movable in both directions indicated by arrows A and B.

Each of the female splined shafts 42 is rotationally supported by a bearing 44 provided in an opening 13A formed in a sidewall 13 of the heating furnace 12 and has a sprocket 45 fixed on an end 44A, which is located laterally of the sidewall 13. Each of the sprockets 45 is coupled with the sprocket 48 of its own servomotor 47 through an endless chain 46. By this arrangement, the respective female splined shafts 42 are rotated to transmit power from the respective servomotors to the respective splined shafts 40, rotating the positioning rollers 24A to 24E in the conveying direction of a glass plate. The respective servomotors 47 are provided laterally of the same sidewall 13 as the respective sprockets 45 of the positioning rollers 24A to 24E. The respective servomotors 47 for the positioning rollers 24A to 24E are controlled by the controller 66 as shown in FIG. 2.

Each of the positioning rollers 24A to 24E shown in FIG. 3 has a left end coupled with a slider 50 through a bearing 49. The slider 50 is supported by a guide 52 so as to be movable in the longitudinal direction of its related positioning roller and is engaged with a feed screw 58, which is coupled with a reducer 56 of its related servomotor (corresponding to a roller displacing means recited in claims). By this arrangement, when the feed screw 58 is rotated by its related servomotor 54, its related slider 50 can be moved in the longitudinal direction of its related positioning roller 24A, 24B, 24C or 24E to move its related positioning roller in the direction indicated by the arrow A or B through its related bearing 49. The respective servomotors 54 are also controlled by the controller 66 shown in FIG. 2. Thus, the axial displacements of the respective positioning rollers 24A to 24E are controlled under the actions of the respective servomotors 54. In this manner, the posture of the glass plate 18 is conformed to the reference posture by the axial movements of positioning rollers 24A to 24E while the glass plate is passing on the positioning rollers 24A to 24E.

Figure 4:
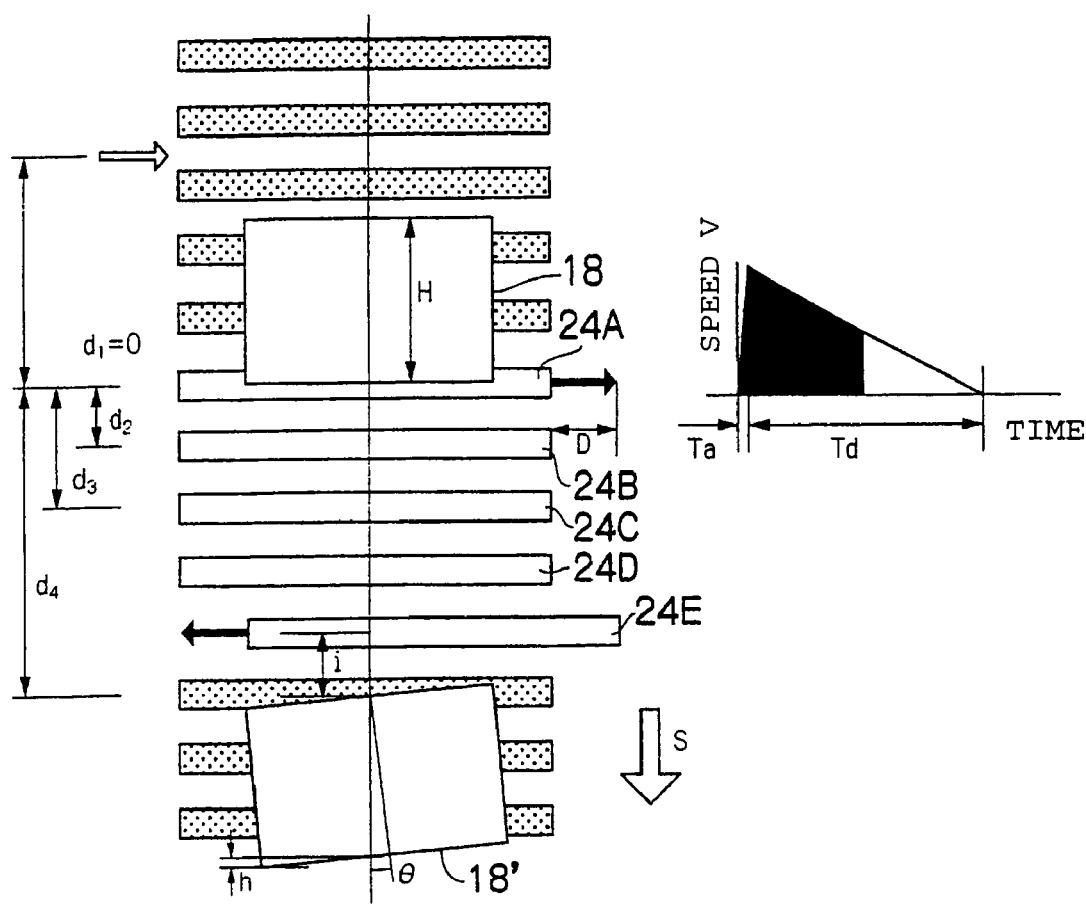
FIG. 4 is a schematic view explaining a mechanism for changing the posture of a glass plate by positioning rollers.

Next, the mechanism for positioning the glass plate according to this embodiment will be described, referring to FIG. 4. In FIG. 4, the glass plate 18 is shown as having a rectangular shape so that it becomes easy to understand how the glass plate 18 changes its posture. The parameters required for conforming the posture of the glass plate 18 to the reference posture (the posture of the glass plate 18') are θ (a changing angle or a deviation angle), S (a conveying speed), H (a glass plate width), h (a preceding distance), i (a distance for completion of passage) and dn (the distance from the positioning roller 24A to the respective positioning rollers 24B, 24C and 24E).

The moving distance or axial displacement D, the moving speed or rotational speed V, the acceleration time period Ta and the deceleration time period Td of each of the positioning rollers 24A to 24E may be calculated based on these parameters, the servomotors 47 and the servomotors 54 are controlled based on the calculated values to perform the positioning operation. However, since the V value, i.e., the rotation speed of each of the servomotors 47 is unambiguously determined according to the production capacity of the heating furnace, the servomotors 54 are controlled based on the constant value V.

In order to see θ (the changing angle or the deviation angle) in the system for positioning a glass plate according to this embodiment, an image of the glass plate 18 just before transference onto the positioning roller 24A is captured by a line sensor (corresponding to an imaging means in the claims) 60 shown in FIG. 5. The line sensor 60 is provided outside of the heating furnace 12 to avoid direct heat conduction from the heating furnace 12. Additionally, the heating furnace 12 has a ceiling wall 13B formed with a first opening 13C, which includes the light source 62 to light up the glass plate in conveyance. The heating furnace has a floor wall 13D formed with a second opening 13E opposite to the opening 13C, and the second opening 13E has a reflection mirror 64 provided thereunder. The reflection mirror 64 serves as reflecting light passing through the glass plate 18 toward the line sensor 60. By this arrangement, the image of the glass plate 18 in conveyance is captured by the line sensor 60, and the line sensor forwards output signals to the controller (corresponding a posture recognizing means, a deviation amount finding means and a displacement finding means in the claims) 66 shown in FIG. 2.

The controller 66 recognizes the outline of the current posture of the glass plate 18 shown in FIG. 4 by subjecting the output signals from the line sensor to a filtering process for edge extraction. The controller 66 compares the recognized posture of the glass plate 18 with the reference posture (the posture of the glass plate 18' shown in FIG. 4) previously stored in a ROM (Read Only Memory) or the like to find a deviation amount θ. Based on the found deviation amount and the other parameters stated earlier, the controller 66 calculates the moving distance or axial displacement D, the moving speed or rotational speed V, the acceleration time period Ta and the deceleration time period Td of each of the positioning rollers 24A to 24E. Based on the calculated values, the controller controls the operations of the servomotors 54.

Figures 6A, 6B:
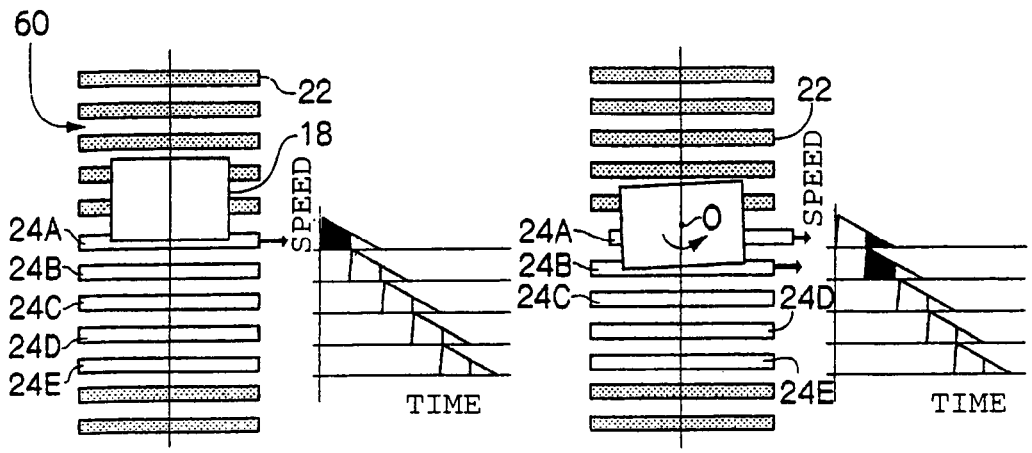
FIGS. 6A to 6F are schematic views showing how the posture of a glass plate is sequentially changed by the positioning rollers.
Figures 6C, 6D:
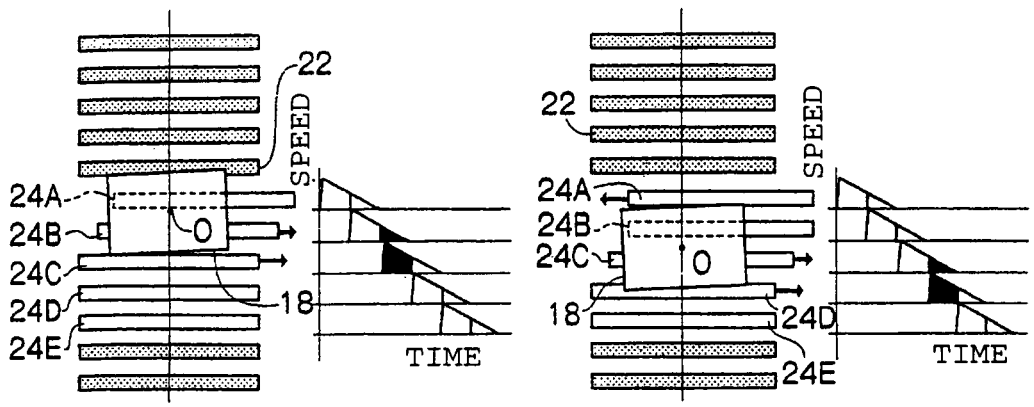
Figures 6E, 6F:
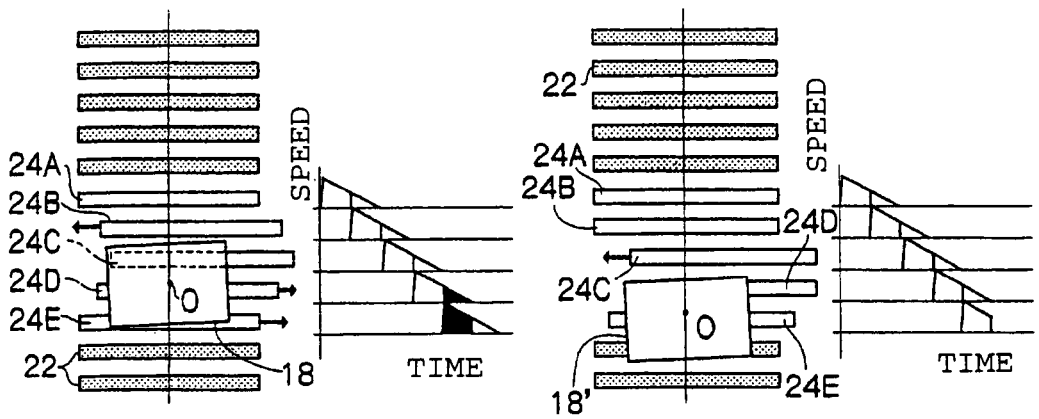

In FIG. 6, there is shown a typical example of the operation of each of the positioning rollers 24A to 24E. In the typical example, explanation will be made about a series procedure wherein the glass plate 18, which has a rectangular shape and is put at a substantially central portion of a roller 22 (see FIG. 6A), is finally made oblique at a certain angle with respect to the conveying direction (see FIG. 6F). When the line sensor 60 (FIG. 5) detects that a leading edge of the conveyed glass plate 18 in the conveying direction has passed, the controller 66 starts to track the conveying position of the glass plate 18 and horizontally moves the positioning rollers 24A or 24E in contact with a front half of the glass plate in the conveying direction to designated positions (calculated based on angular data), depending on the conveying speed.

The positioning rollers 24A to 24E are moved in a right or left direction in these figures based on the calculation results by the controller 66. The respective positioning rollers 24A to 24E are horizontally moved at a high speed at the time of making contact with the leading edge of the conveyed glass plate 18 in the conveying direction. The horizontal movement of each of the positioning rollers is gradually decelerated as the central point 0 of the glass plate 18 is approaching. The horizontal movement of each of the positioning rollers is finally stopped at the time of making contact with the central point 0 of the glass plate 18. The respective positioning rollers 24A to 24E are returned to their own original standby positions when the glass plate 18 has passed the respective positioning rollers 24A to 24E.

Explanation of FIGS. 6A to 6F will be made with respect to the positioning operation stated earlier. In each of the figures, a top plan view of the roller conveyor is shown on the left side, and a graph, which shows the speed and the timing to horizontally move each of the positioning rollers 24A to 24E.

FIG. 6A shows a state wherein the leading edge of the conveyed glass plate 18 in the conveying direction has made contact with the positioning roller 24A. Immediately after that, the positioning roller 24A is moved in the right direction in this figure.

FIG. 6B shows a state wherein the leading edge of the conveyed glass plate 18 in the conveying direction has made contact with the positioning roller 24B. Immediately after that, the positioning roller 24B is moved in the right direction in this figure, and the movement of the positioning roller 24A in the right direction is decelerated. A force, which is generated by the friction resistance due to the movements of the positioning rollers 24A and 24B in the right direction, is applied to the glass plate 18 in a counterclockwise direction about the point 0 determined by the friction of the glass plate 18. Thus, the glass plate 18 has the posture made oblique toward the direction of the applied force.

FIG. 6C shows a state wherein the leading edge of the conveyed glass plate 18 in the conveying direction has made contact with the positioning roller 24C. Immediately after that, the positioning roller 24C is moved in the right direction in this figure, the movement of the positioning roller 24B in the right direction is decelerated, and the movement of the positioning roller 24A in the right direction is stopped. Since a force, which is generated by the friction of the glass plate 18 in an action similar to the action as stated earlier, is applied to the glass plate 18 in a counterclockwise direction about the point 0 determined by the friction of the glass plate 18, the glass plate 18 has the posture made further oblique toward the direction of the newly applied force.

FIG. 6D shows a state wherein the leading edge of the conveyed glass plate 18 in the conveying direction has made contact with the positioning roller 24D. Immediately after that, the positioning roller 24D is moved in the right direction in this figure, and the movement of the positioning roller 24C in the right direction is decelerated.

Additionally, the movement of the positioning roller 24B in the right direction is stopped, and the positioning roller 24A is returned to its own standby position. By this action, the glass plate 18 has the posture further changed in the counterclockwise direction about the point 0 determined by the friction of the glass plate 18.

FIG. 6E shows a state wherein the leading edge of the conveyed glass plate 18 in the conveying direction has made contact with the positioning roller 24E. Immediately after that, the positioning roller 24E is moved in the right direction in this figure, and the movement of the positioning roller 24D in the right direction is decelerated.

Additionally, the movement of the positioning roller 24C in the right direction is stopped, and the positioning roller 24B is returned to its own standby position. By this action, the glass plate 18 has the posture further changed in the counterclockwise direction about the point 0 determined by the friction of the glass plate 18 to bring the glass plate nearer to the reference posture.

FIG. 6F shows a state wherein the leading edge of the conveyed glass plate 18 in the conveying direction has made contact with the roller 22 just downstream of the positioning roller 24E. Immediately after that, the movement of the positioning roller 24E in the right direction is decelerated. Additionally, the movement of the positioning roller 24D in the right direction is stopped, and the positioning roller 24C is returned to its own standby position. When the point 0 determined by the friction of the glass plate 18 has passed the positioning roller 24E, the horizontal movement of the positioning roller 24E is stopped. By this action, the glass plate 18 is conveyed onto the bending stage, having the posture further changed in the counterclockwise direction about the point 0 determined by the friction of the glass plate 18 to be conformed to the reference posture. The positioning rollers 24D and 24E are returned to their own standby positions in this order.

This is the explanation of the procedure for positioning the glass plate 18 by the positioning rollers 24A to 24E. Although the operation for turning the glass plate 18 in the counterclockwise direction has been described with respect to FIGS. 6A to 6F, the positioning rollers 24A to 24E may be moved in the left direction to return the glass plate 18 in the clockwise direction.

By the method for positioning the glass plate 18 according to this embodiment, while the glass plate 18 is being conveyed by the positioning rollers 24A to 24E, the posture of the glass plate is conformed to the reference posture by axially displacing the positioning rollers 24A or 24E in contact with the glass plate 18. Accordingly, the glass plate 18 can be positioned without being deformed or damaged. Although the explanation was made about the case of using the five rollers 24A to 24E as the positioning rollers for simplification, the present invention is operable as long as there is provided at least one positioning roller for the positioning operation.

Since it is possible to cope with the positioning of various types of glass plates by using only the rollers 24A to 24E in the roller conveyor 20 as the positioning rollers and controlling the axial displacements of the rollers 24A to 24E, no work for the job change becomes substantially necessary, which can improve the production capacity of curved glass plates in comparison with the conventional method.

The image of the glass plate 18, which is being conveyed by the roller conveyor 20, is captured by the line sensor 60, the posture of the glass plate 18 is recognized based on the captured image of the glass plate 18 in conveyance, the recognized posture is compared with the reference posture previously stored in the memory to find the deviation amount $\theta$ of the glass plate, the axial displacement amounts for the respective positioning rollers 24A to 24E are found based on the found deviation amount $\theta$, and the respective positioning rollers 24A to 24E are axially moved in response to the found deviation amounts by the respective servomotors 54. Thus, the glass plate 18 can be automatically positioned.

Since the line sensor 60 is adopted as the imaging means, the second opening 13E formed in the heating furnace 12 can be made smaller than the provision of an area sensor, preventing the temperature in the heating furnace from lowering.

Although the respective positioning rollers 24A to 24E are independently moved one after another in conjunction with the conveyance of the glass plate 18 in the example shown in FIGS. 6A to 6F, plural rollers among the positioning rollers 24A to 24E may be simultaneously moved to change the posture of the glass plate 18 as shown in FIGS. 7A to 7D.

Figures 7A, 7B, 7C, 7D:
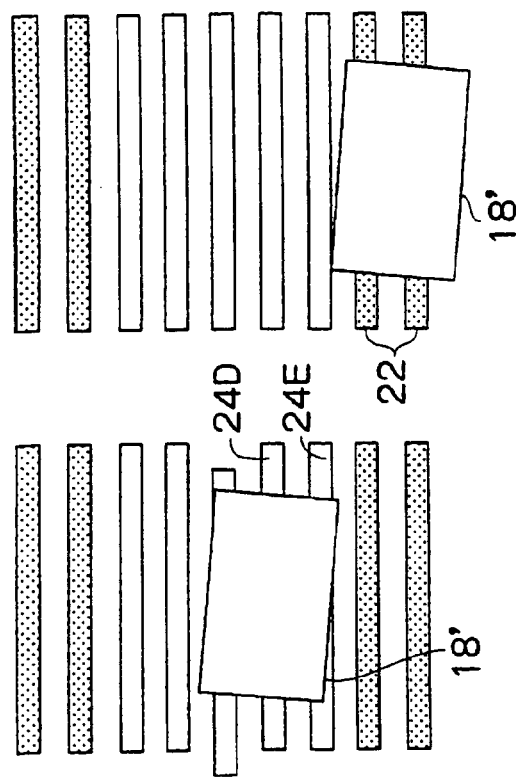
FIGS. 7A to 7D are schematic views showing how the glass plate is sequentially positioned.

As shown in FIGS. 7A to 7D, when the glass plate 18 has been transferred onto the three positioning rollers 24A, 24B and 24C, these rollers 24A, 24B and 24C are instantly and simultaneously moved in the left direction in these figures to conform the posture of the glass plate 18 to the reference posture. By this operation, the posture change is enabled without moving the positioning rollers 24D and 24E, which can be seen from FIGS. 7C and 7D. Referring to FIG. 7B, when the glass plate 18 has been transferred onto the positioning rollers 24A, 24B and 24C, the positioning roller 24A and the positioning roller 24C may be instantly moved in the right direction and the left direction, respectively, with the positioning roller 24B being stayed at its own standby position, to conform the posture of the glass plate 18 to the reference posture.

Figure 9:
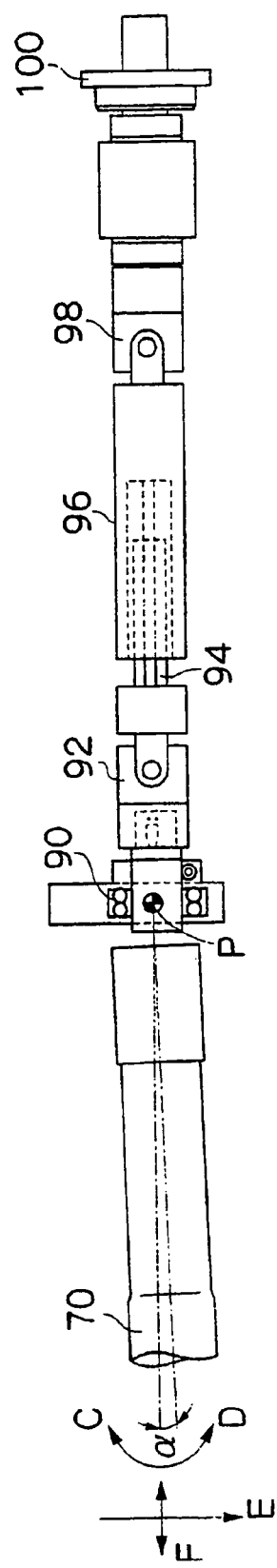
FIG. 9 is a view showing the structure of a positioning roller according to another typical example.
Figures 11A, 11B, 11C, 11D:
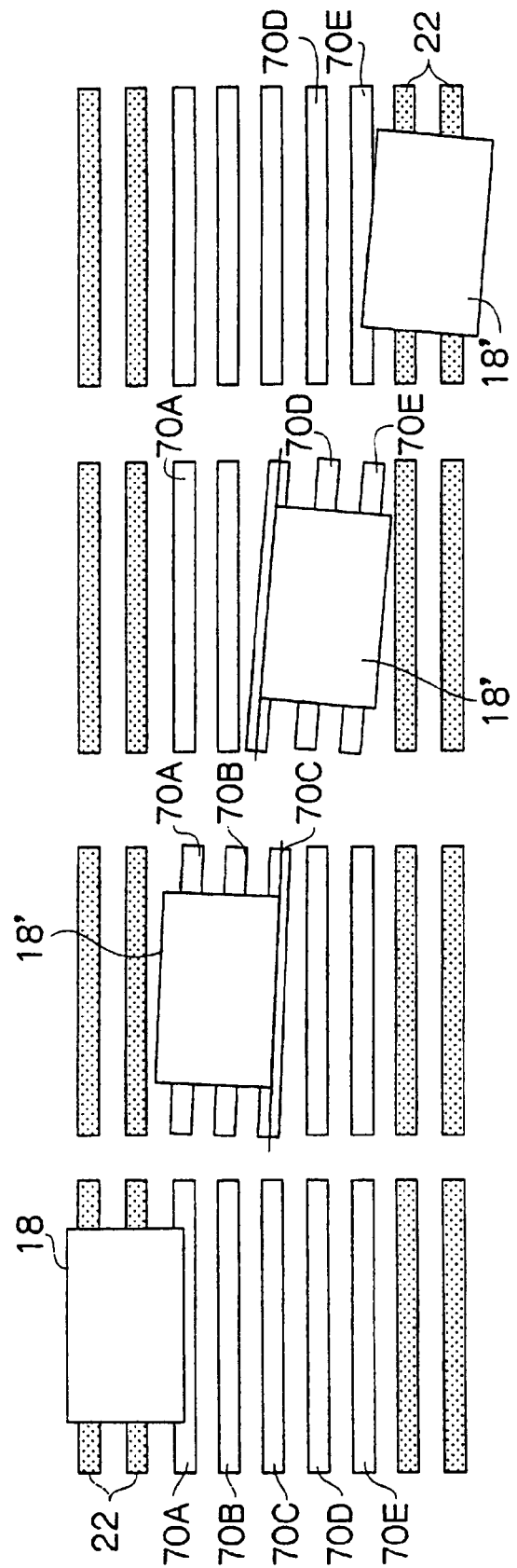
FIGS. 11A to 11D are schematic views showing how a glass plate is sequentially positioned.

FIGS. 8 and 9 show the structure of each of the positioning rollers 70 according to another embodiment. Although the positioning rollers 24A to 24E shown in FIG. 3 are configured to be axially displaced by being moved in the axial directions thereof, the positioning roller 70 shown in FIGS. 8 and 9 is configured to be axially displaced and have one end displaced in the conveying direction by being swung in the direction indicated by an arrow C or D along a glass plate conveying surface about a swinging shaft P. In other words, when the positioning roller 70 is swung through an angle of a deg with respect to the direction (indicated by an arrow F) perpendicular to a glass plate conveying direction (indicated by an arrow E), the positioning roller 70 is axially displaced by an amount that is obtained by subtracting the value of cos α from the full length of the roller 70.

As shown in FIG. 8, each of the positioning rollers 70 has a left end coaxially coupled with a coupling bar 72, which passes through a self-aligning bearing 73 and is supported by a slider 76 through a holder 74 holding the bearing 73. The slider 76 is supported so as to be slidable in both directions indicated by arrows F (directions perpendicular to the glass plate conveying direction) along a guide rail 80 on a slider 78 provided under the slider 76. The slider 78 is supported so as to be slidable in both directions indicated by arrows E (the glass plate conveying direction) along a guide rail 82 provided under the slider 78. By this arrangement, the holder 74 can be moved along the glass plate conveying direction.

The coupling bar 72 has a leading end swingably coupled with a U-character shaped arm 84 through a bearing 83. The arm 84 has a lower portion coupled with the output shaft 88 of its related servomotor 86. When the servomotor 86 is controllably driven by the controller 66, the positioning roller 70 can be swung along the glass plate conveying direction through the coupling bar 72 since the arm 84 is swingable in both directions indicated by arrows G and H about the output shaft 88.

Each of the positioning rollers 70 has a right end in FIG. 8 swingably supported by a bearing block 90, which is mounted on the wall of the heating furnace so as to be swingable in both directions of the arrows C and D about the swinging shaft P. Each of the positioning rollers 70 has the right end coupled, through a universal joint 92, with a male splined shaft 94, which is engaged with a female splined shaft 96 formed in a cylindrical shape. By this arrangement, the positioning roller 70 is coupled with the female splined shaft 96 so as to be movable in both axial directions indicated by the arrows F.

The female splined shaft 96 is coupled with a sprocket 100 through a universal joint 98. The sprocket 100 is coupled with its related electric motor for rotation through an unshown chain and is rotated by power transmitted from the motor through the chain. The motor is also controlled by the controller 66.

FIGS. 10A to 11D show other typical examples of the method for changing the posture of the glass plate 18 in a case wherein five positioning rollers 70A to 70E are provided. In this embodiment as well, the present invention is operable as long as there is provided at least one positioning roller for the positioning operation.

As shown in FIGS. 10A and 10B, when the glass plate 18 is transferred onto the positioning rollers 70A and 70B, the positioning rollers 70A, 70B and 70C are instantly swung in a clockwise direction to conform the posture of the glass plate 18 to the reference posture. When the posture of the glass plate 18 is converse to the shown posture, the positioning rollers 70A, 70B and 70C are instantly swung in a counterclockwise direction to conform the posture of the glass plate 18 to the reference posture. By this operation, the posture change is enabled without moving the positioning rollers 70D and 70E, which can be seen from FIGS. 10C and 10D.

As shown in FIGS. 11A to 11E, the respective positioning rollers 70A to 70E may be swung in conjunction with the conveying position of the glass plate 18 to conform the posture of the glass plate 18 with the reference posture.

Additionally, as shown in FIGS. 12A to 12C, all positioning rollers 70A to 70E may be simultaneously swung. In this case, the swinging center lies on a centerline "a" shown in FIG. 12A.

In the method wherein all positioning rollers 70A to 70E are simultaneously swung, the positioning rollers 70A to 70E cannot be returned to their own standby positions until the glass plate 18 has passed the positioning roller 70E since the positioning rollers 70A to 70E are carrying the glass plate 18 that is being swung. From this viewpoint, when glass plates 18 flow one after another, the embodiment wherein the positioning rollers 70A to 70E are swung one after another is advantageous in terms of an increase in productivity since it is necessary to ensure a spacing between a glass plate 18 and the next glass plate 18.

Now, the bending stage 14 will be described. Since the basic structure and the operation of the bending stage has been disclosed in U.S. Pat. No. 6,397,634, the bending stage will be briefly described. The bending roller conveyer 26 includes the plural bending rollers 28, and the glass plate 18 is conveyed on the conveying surface, which is defined by the bending rollers 28. Bending rollers, which are provided in intermediate and downstream portions of the bending roller conveyer, e.g., thirteen bending rollers 28A to 28M shown in FIG. 13, are independently and vertically moved by a vertical direction driving means.

Figure 13A:
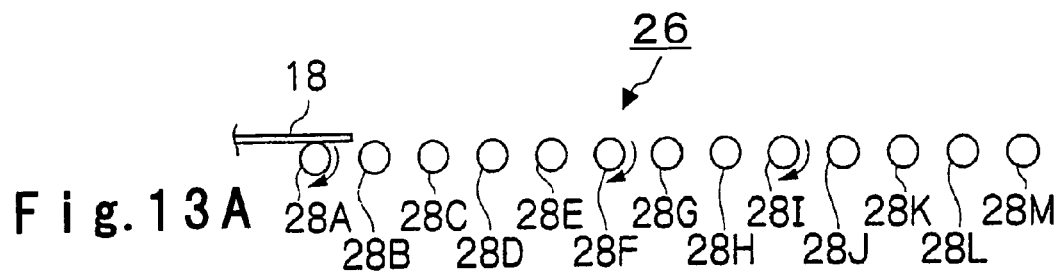
FIGS. 13A to 13E are schematic views showing how a bending roller conveyor operates on a bending stage.
Figure 13B:
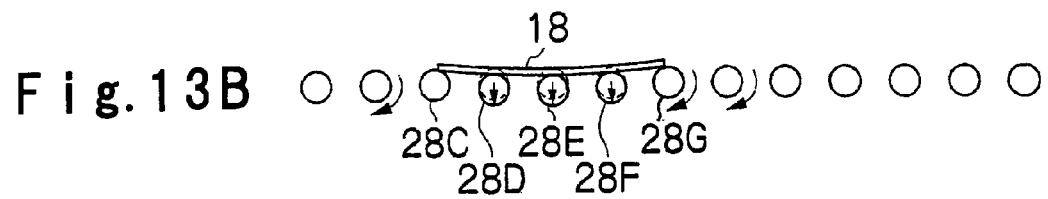
Figure 13C:
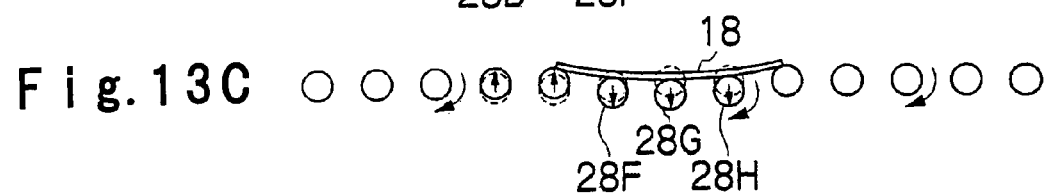
Figure 13D:
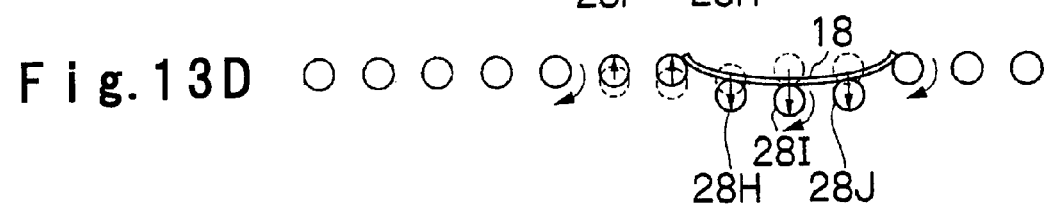
Figure 13E:
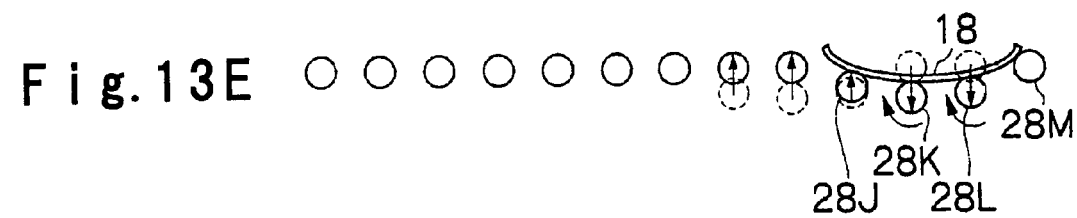

When the heated glass plate 18 has arrived at the roller 28A, the bending rollers 28A to 28M, which are under multiple axis control by a motion controller, lie at the highest position in the vertical direction, and the conveying surface defined by the bending rollers 28A to 28M extends horizontally as shown in FIG. 13A. While the glass plate 18 is conveyed on the bending rollers 28A to 28M, the respective bending rollers 28D to 28F lower by certain amounts so that the conveying surface defined by the bending rollers 28D to 28F transforms into a curved shape corresponding to the curvature of the glass sheet 18 to be bent as shown in FIG. 13B. As the glass plate 18 is being conveyed, the respective bending rollers 28G to 28L, on which the conveyed glass plate 18 lies, also lower by certain amounts so that the conveying surface is transformed so as to have proper curvatures as shown in FIGS. 13C, 13D and 13E. Thus, the glass plate 18 is downwardly sagged by its own weight along the curved surfaces defined by the bending rollers 28A to 28M to be bent so as to have a desired curvature, passing on the bending rollers 28A to 28M. This is the explanation of the method for bending the glass plate 18 on the bending stage 14.

In accordance with the method for bending the glass plate 18 by using the bending system 10 shown in FIG. 1, the glass plate is bent so as to have the desired curved shape by the bending stage 14 after the glass plate 18 has been positioned so as to take the reference posture by the positioning rollers 24A to 24E at the outlet of the heating furnace 11. As a result, no work for the job change becomes necessary, which can improve the productivity of curved glass plates in comparison with methods using the conventional positioner.

On the bending stage 14, the bending rollers 28A to 28M are vertically moved according to the conveying position of the glass plate 18 while conveying the glass plate along the conveying surface defined by the bending rollers 28A to 28M in the bending roller conveyer 26. Since the glass plate 18 is bent so as to have the desired curved shape by its own weight on the bending stage, no work for the job change with respect to the positioning operation of the glass plate 18 and the bending operation of the glass plate becomes unnecessary, which can contribute to further improve the productivity of curved glass plates. The structure of the bending stage 14 is not limited to the one shown in FIG. 13 in the present invention. For example, the positioning method according to the present invention is applicable to bending processes, such as bending a glass plate by a press and bending a glass plate by its own weight with use of curved rollers.

A method for correcting the deviation angle of a conveyed glass plate (see FIG. 4) has been described. However, when a glass plate is actually conveyed, a problem is created about the deviation amount in the direction perpendicular to the conveying direction in some cases. Now, the method for correcting the deviation amount in the direction perpendicular to the conveying direction will be described.

Figure 14A:
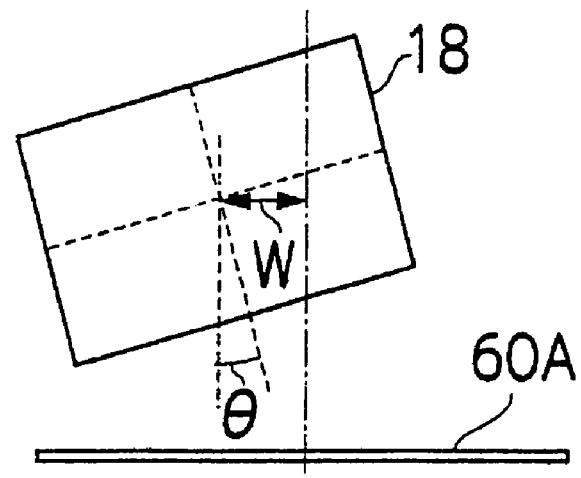
FIGS. 14A to 14C are schematic views showing how a glass plate is sequentially positioned.
Figure 14B:
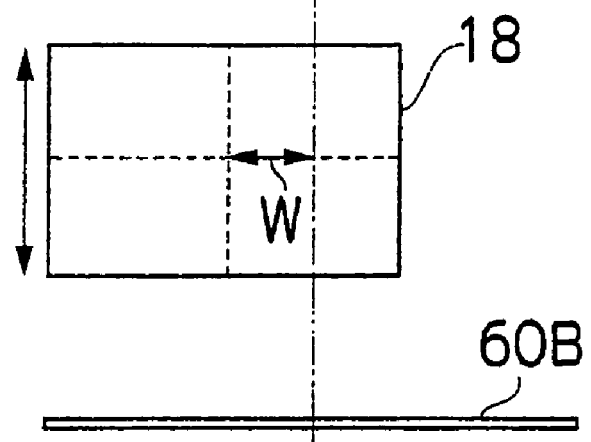
Figure 14C:
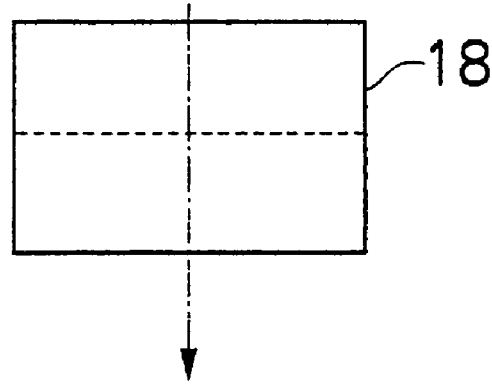

FIGS. 14A, 14B and 14C are schematic views showing the procedure to correct both deviation angle θ and deviation amount W. As shown in FIG. 14A, there is a possibility that the glass plate 18 conveyed on the roller conveyer take a deviated posture defined by a deviation angle θ and a deviation amount W during conveyance. In order to cope with this problem, the deviation angle θ is first corrected at a front half portion of the roller conveyer as shown in FIG. 14B. The front half portion of the roller conveyer is provided with a line camera 60A. Based on an image captured by the camera 60A, the positioning rollers are properly moved to correct the deviation angle θ. The specific procedure for correction is as stated with respect to FIGS. 6A to 6F.

The roller conveyer has a rear half portion provided with a line camera 60B. The deviation amount W is corrected based on an image captured by the camera 60B. In other words, the length H of the glass plate 18 in the conveying direction is instantly recognized from the captured image, and the positioning rollers, which lie just under the glass plate 18, are instantly moved in the horizontal direction to correct the deviation amount W. Thus, the glass plate 18 can be conveyed, taking a proper posture.

As explained, the present invention can conform the posture of a conveyed glass plate to the reference posture by conveying the glass plate by a roller conveyer including a plurality of rollers while axially displacing a roller in contact with the conveyed glass plate. Accordingly, the present invention cannot only position glass plates without deforming or damaging the glass plates but also make use of an existing roller conveyer as a positioning roller conveyer to substantially eliminate the job change, which can contribute to improve the productivity of curved glass plates.

Although the present invention is applicable inside and outside a heating furnace, the present invention is particularly appropriate to a process wherein bending is performed in the heating furnace. The present invention is appropriate to the production of windows, which are used not only automobiles but also rail cars, ships, airplanes, buildings and the like.

What is claimed is:

1. A method for positioning a glass plate, comprising:
   conveying a glass plate along a conveying direction by a roller conveyor including a plurality of rollers, each roller having a rolling axis; and
   pivoting at least one of the plurality of rollers individually around an axis substantially perpendicular to both the conveying direction and the rolling axis when the at least one of the plurality of rollers is in contact with the glass plate in conveyance, to position the glass plate so as to conform a posture of the glass plate to a reference posture.

2. The method according to claim 1, further comprising:
   using an imaging means to capture an image of the glass plate conveyed by the roller conveyor;
   recognizing the posture of the glass plate based on the captured image of the glass plate;
   comparing the recognized posture with the reference posture previously stored to find a deviation amount of the posture of the glass plate with respect to the reference posture;
   and finding an axial displacement amount to be applied to the roller in contact with the glass plate based on the found deviation amount and pivoting the roller in contact with the glass plate in accordance with the found axial displacement amount.

3. The method according to claim 1, further comprising independently pivoting plural rollers lying under the glass plate one after another in conjunction of the conveyance of the glass plate.

4. The method according to claim 1, further comprising simultaneously pivoting plural rollers supporting the glass plate.

5. A method for bending a glass plate, comprising:
   using the method for positioning a glass plate defined in claim 1 to position the glass plate so as to conform a posture of the glass plate with a reference posture, the glass plate having been heated to a glass bending temperature; and
   bending the positioned glass plate in a desired curved shape.

6. The method according to claim 5, wherein the bending of the positioned glass plate is performed by making use of vertical movement of rollers.

* * * * *